US010011087B2

(12) United States Patent
Massarelli et al.

(10) Patent No.: US 10,011,087 B2
(45) Date of Patent: Jul. 3, 2018

(54) MULTILAYER PANEL FOR SOUNDPROOFING AIRCRAFT INTERIORS

(71) Applicant: MECAER AVIATION GROUP S.p.A., Borgomanero (IT)

(72) Inventors: Vincenzo Massarelli, Borgomanero (IT); Valentina Canala, Borgomanero (IT)

(73) Assignee: MECAER AVIATION GROUP S.P.A., Borgomanero (IT)

( * ) Notice: Subject to any disclaimer, the term of this patent is extended or adjusted under 35 U.S.C. 154(b) by 0 days.

(21) Appl. No.: 15/212,245

(22) Filed: Jul. 17, 2016

(65) Prior Publication Data

US 2017/0015081 A1 Jan. 19, 2017

(30) Foreign Application Priority Data

Jul. 17, 2015 (IT) .................. 102015000035599

(51) Int. Cl.
*B32B 3/12* (2006.01)
*B32B 3/18* (2006.01)
(Continued)

(52) U.S. Cl.
CPC .............. *B32B 3/12* (2013.01); *B32B 5/02* (2013.01); *B32B 5/18* (2013.01); *B32B 7/12* (2013.01);
(Continued)

(58) Field of Classification Search
CPC .... B32B 3/12; B32B 3/18; B32B 5/02; B32B 7/12; B32B 2255/02; B64C 1/40; B60R 13/08; G10K 11/168
See application file for complete search history.

(56) References Cited

U.S. PATENT DOCUMENTS 3,525,663 A * 8/1970 Hale .................... B29C 51/006
  405/36
4,384,634 A * 5/1983 Shuttleworth .......... F02C 7/045
  181/213

(Continued)

FOREIGN PATENT DOCUMENTS

| EP | 0146521 A2 | 9/2003 |
| FR | 2939406 A1 | 6/2010 |
| WO | 03076232 A1 | 9/2003 |

OTHER PUBLICATIONS

Italian Patent Office; Search Report for Italian Patent Application No. 102015000035599 dated Apr. 5, 2016, 8 Pages.

(Continued)

*Primary Examiner* — Edgardo San Martin
(74) *Attorney, Agent, or Firm* — Christopher J. Knors; Moore & Van Allen PLLC

(57) ABSTRACT

Panel for soundproofing aircraft interiors comprising a first and a second layer and an intermediate layer of damping material placed between the first and second layer along a neutral axis of the soundproofing panel. The first and the second layer each comprising a structural layer and a surface layer placed on the opposite side to the intermediate layer and connected thereto, adhering continuously by means of an adhesive layer, the intermediate layer extends for the entire area of the panel and is connected to the structural layers of the first and second layer. The intermediate layer comprises a polymer foam material having a uniform thickness less than 2 mm and weight of less than 1.2 kg/m$^2$.

11 Claims, 3 Drawing Sheets

(51) Int. Cl.

| | | |
|---|---|---|
| B32B 7/12 | (2006.01) | |
| B64C 1/40 | (2006.01) | |
| G10K 11/168 | (2006.01) | |
| G10K 11/172 | (2006.01) | |
| B32B 5/18 | (2006.01) | |
| B32B 27/06 | (2006.01) | |
| B32B 37/06 | (2006.01) | |
| B32B 37/08 | (2006.01) | |
| B32B 37/14 | (2006.01) | |
| B64C 1/06 | (2006.01) | |
| B32B 5/02 | (2006.01) | |
| B32B 27/08 | (2006.01) | |
| B32B 27/12 | (2006.01) | |
| B32B 27/34 | (2006.01) | |
| B32B 27/38 | (2006.01) | |
| B32B 3/10 | (2006.01) | |
| B32B 7/04 | (2006.01) | |
| B64C 1/00 | (2006.01) | |

(52) U.S. Cl.
CPC ............ *B32B 27/06* (2013.01); *B32B 27/065* (2013.01); *B32B 27/08* (2013.01); *B32B 27/12* (2013.01); *B32B 27/34* (2013.01); *B32B 27/38* (2013.01); *B32B 37/06* (2013.01); *B32B 37/08* (2013.01); *B32B 37/142* (2013.01); *B64C 1/066* (2013.01); *B64C 1/40* (2013.01); *G10K 11/168* (2013.01); *G10K 11/172* (2013.01); *B32B 2260/021* (2013.01); *B32B 2260/046* (2013.01); *B32B 2262/106* (2013.01); *B32B 2266/0207* (2013.01); *B32B 2307/102* (2013.01); *B32B 2307/3065* (2013.01); *B32B 2307/546* (2013.01); *B32B 2307/718* (2013.01); *B32B 2307/72* (2013.01); *B32B 2307/732* (2013.01); *B32B 2605/003* (2013.01); *B32B 2605/18* (2013.01)

(56) References Cited

U.S. PATENT DOCUMENTS

| | | | | |
|---|---|---|---|---|
| 4,848,514 A | * | 7/1989 | Snyder | B32B 15/04 181/222 |
| 5,175,401 A | | 12/1992 | Arcas et al. | |
| 5,240,221 A | * | 8/1993 | Thomasen | F16F 7/108 181/207 |
| 5,460,865 A | * | 10/1995 | Tsotsis | B32B 3/12 428/116 |
| 5,518,796 A | * | 5/1996 | Tsotsis | B32B 3/12 428/116 |
| 6,177,173 B1 | * | 1/2001 | Nelson | B32B 7/02 156/250 |
| 6,179,086 B1 | * | 1/2001 | Bansemir | G10K 11/172 181/198 |
| 6,183,837 B1 | * | 2/2001 | Kim | E01F 8/0017 181/292 |
| 6,224,020 B1 | * | 5/2001 | Hopkins | B64G 1/002 244/173.1 |
| 6,520,134 B1 | * | 2/2003 | Plunkett | F02F 7/006 123/195 C |
| 6,676,199 B2 | * | 1/2004 | Buisson | B32B 3/12 296/193.07 |
| 8,127,889 B1 | * | 3/2012 | Mathur | B64C 1/40 181/290 |
| 8,196,704 B2 | * | 6/2012 | Chiou | G10K 11/168 181/214 |
| 8,336,804 B2 | * | 12/2012 | Hoetzeldt | B32B 3/08 181/288 |
| 8,424,251 B2 | * | 4/2013 | Tinianov | B32B 37/12 156/314 |
| 8,453,793 B1 | * | 6/2013 | Franzoi | F02C 7/045 181/284 |
| 8,474,574 B1 | * | 7/2013 | Kobayashi | G10K 11/168 181/208 |
| 8,499,887 B2 | * | 8/2013 | Gleine | B60R 13/0815 181/292 |
| 8,590,272 B2 | * | 11/2013 | Thomas | B32B 7/14 52/783.13 |
| 8,770,343 B2 | * | 7/2014 | Mathur | B64C 1/066 181/210 |
| 9,085,894 B2 | * | 7/2015 | Eckman | B32B 7/14 |
| 9,688,050 B2 | * | 6/2017 | Carlson | B29C 44/1228 |
| 2002/0070077 A1 | | 6/2002 | Porte et al. | |
| 2006/0059828 A1 | * | 3/2006 | Stevenson | B29C 73/06 52/514 |
| 2008/0164093 A1 | * | 7/2008 | Hirai | B32B 5/18 181/290 |
| 2009/0159363 A1 | * | 6/2009 | Weber | A47B 83/04 181/290 |
| 2009/0230729 A1 | * | 9/2009 | Lusk | B29C 70/443 296/193.07 |
| 2010/0170746 A1 | | 7/2010 | Restuccia et al. | |
| 2012/0153242 A1 | * | 6/2012 | Le Bonte | B29C 44/1228 252/606 |
| 2012/0177877 A1 | | 7/2012 | Lebail et al. | |
| 2013/0264147 A1 | | 10/2013 | Sugimoto et al. | |
| 2014/0216847 A1 | | 8/2014 | Blinkhorn et al. | |
| 2017/0136325 A1 | * | 5/2017 | Fox | A63B 59/42 |

OTHER PUBLICATIONS

EPO; European Search Report for Application No. 16179786.5 dated Dec. 7, 2016; 8 pages.
EPO; European Search Report for European Application No. 16179786.5 dated Mar. 21, 2017, 18 pages.
"Hysol Surface Preparation Guide" dated Sep. 30, 2013, Henkel Corporation, 11 pages.

* cited by examiner

MULTILAYER PANEL FOR SOUNDPROOFING AIRCRAFT INTERIORS

The present invention relates to a multilayer panel, in particular a multilayer panel for soundproofing aircraft interiors.

BACKGROUND

There are two main sources of aircraft noise: the propulsion system and aerodynamic stresses.

To reduce the aerodynamic noise, barrier materials and/or absorption materials are normally used. To reduce the noise caused by vibrations induced by the propulsion system vibration isolating devices and damping materials are typically used.

A typical example of a soundproofing panel for interiors (FIG. 1) comprises, in this order from the inside out, a structural sandwich consisting of a honeycomb panel sandwiched between two layers of epoxy prepreg, a layer of damping material, a sound-absorbing layer and a barrier layer.

In this type of panel the incident pressure wave causes a flexural stress in the structural sandwich which translates into flexural stresses concentrated at the interface between the structural sandwich and the damping layer.

The attenuation of the sound pressure wave is entrusted solely to the type of damping material used, the design parameters of which consist of the weight and the damping coefficient.

Prior examples of multilayer soundproofing panels are described in US2009/0230729A1 and US2002/0070077A1.

SUMMARY

The purpose of the present invention is to make a multilayer panel having improved soundproofing properties compared to the prior art and which is at the same time lightweight and easy to make.

The aforesaid purpose is achieved by a multilayer panel as presently described and obtained according to the method herein disclosed.

BRIEF DESCRIPTION OF THE DRAWINGS

For a better understanding of the present invention, a preferred embodiment will be described below by way of a non-limiting example and with reference to the appended drawings, wherein.

DETAILED DESCRIPTION

Figure 1:
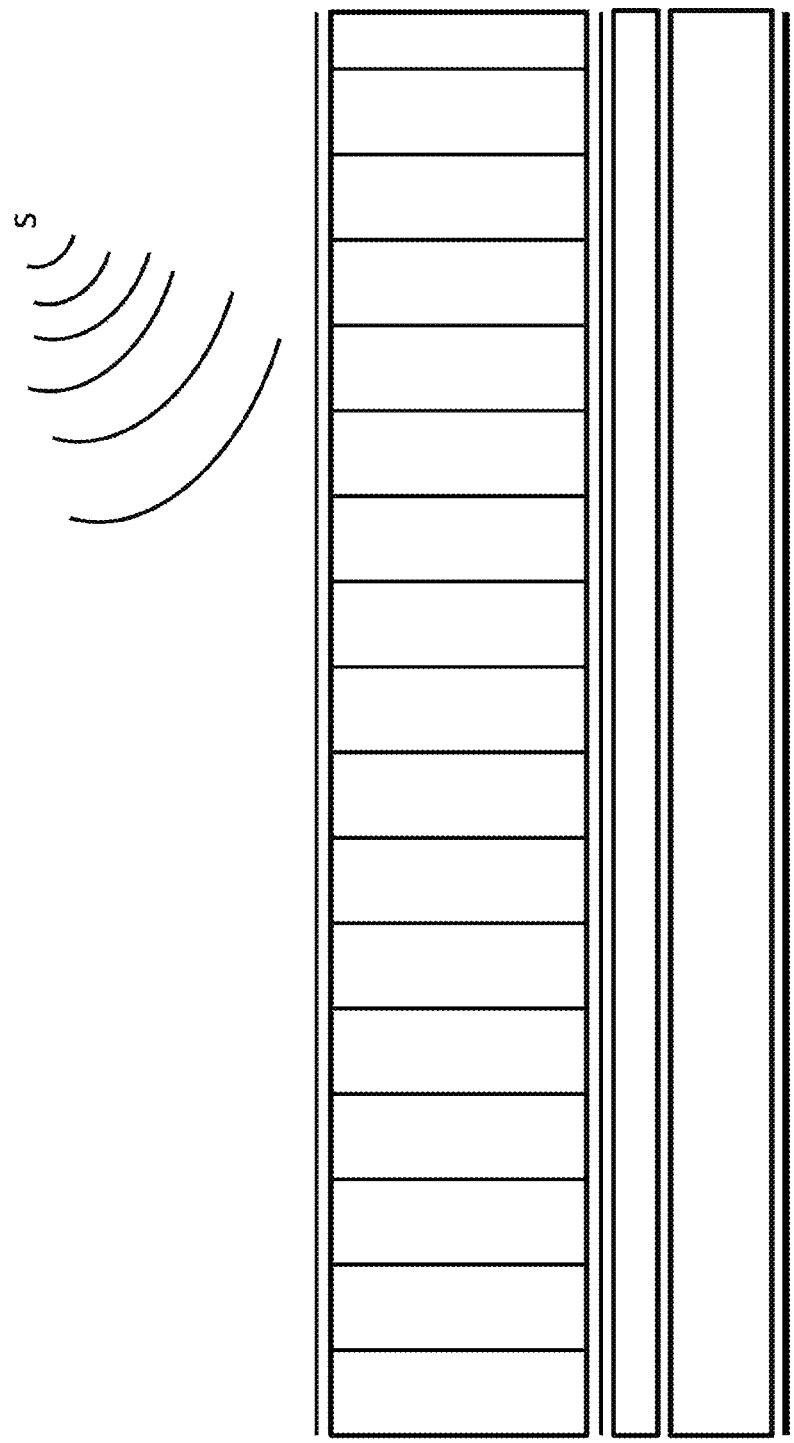
FIG. 1 is a schematic cross-section showing a soundproofed panel according to the prior art.
Figure 2:
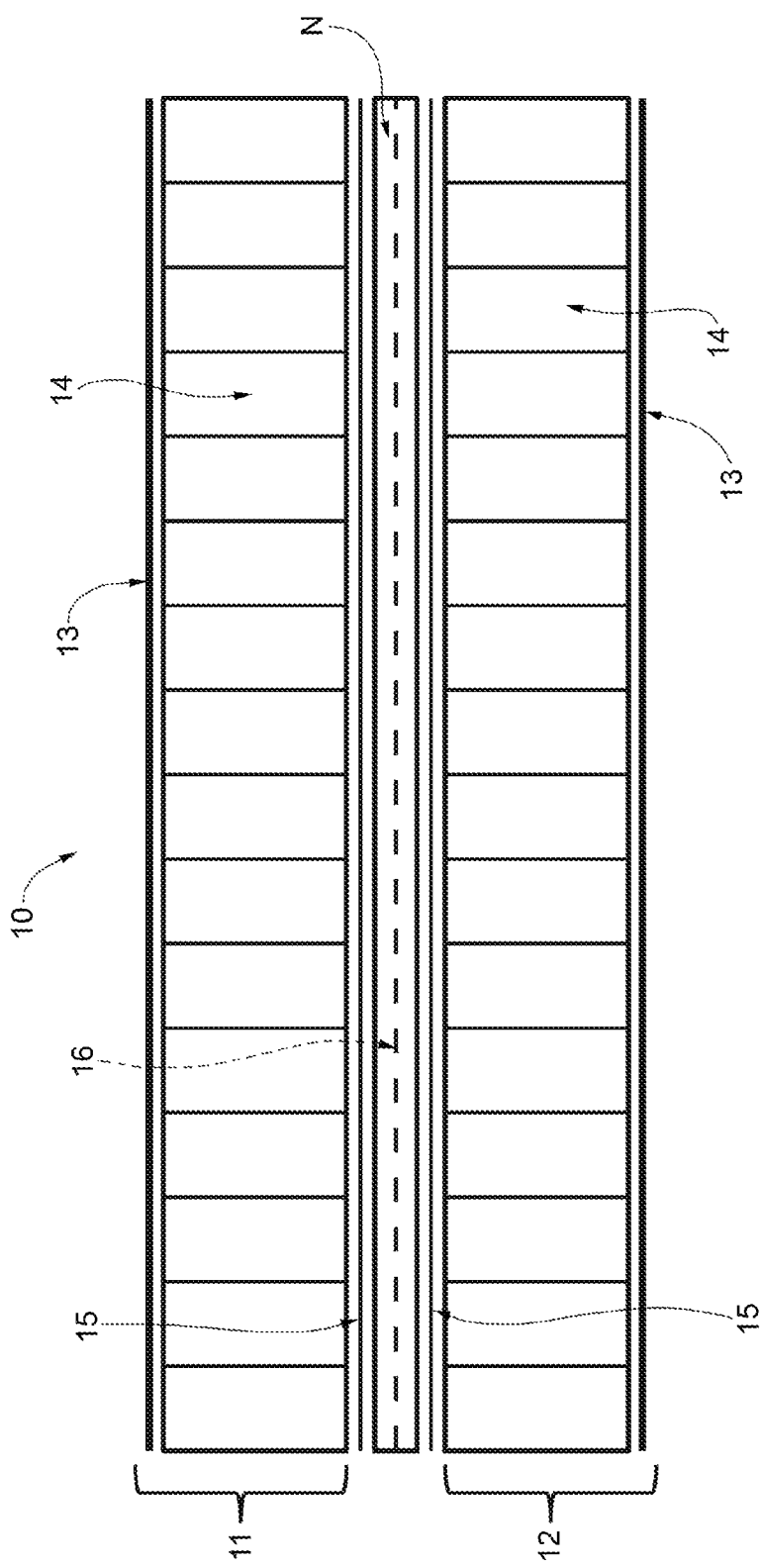
FIG. 2 is a schematic cross-section showing a soundproofed panel according to the invention in an undeformed condition.

FIG. 2 is a diagram of a soundproofing multilayer panel 10 according to the invention.

The soundproofing panel 10 essentially comprises a first layer 11 and a second layer 12 suitable to face towards the outside and towards the inside respectively, of an aircraft cabin, hereinafter referred to for brevity as "outer layer 11" and "inner layer 12" and an intermediate layer 16 of damping material.

The outer layer 11 and the inner layer 12 each comprise a structural layer 14 preferably consisting of a honeycomb structure or rigid foam and a single covering surface 13 in prepreg placed on the opposite side to the intermediate layer 16.

For example the honeycomb structure may be in aramid material, with hexagonal cells of 3.2 mm in size and wall thickness of about 0.051 mm, a transversal thickness of 3.18 mm and a density of 48 kg/m$^3$. One example of a utilizable honeycomb structure consists of that marketed by the Hexcel Corporation, code no. HRH-10-1/8-3.0.

For example the layer 13 may consist of a carbon fiber fabric impregnated with epoxy resin with a cross-linking temperature of 130° C., weight equal to 0.7 kg/m$^2$ and a thickness between 0.4 and 0.5 mm, preferably of 0.45 mm. An example of a utilizable prepreg material is the material marketed by the Hexcel Corporation, code no. M$^2$6\45%\G1070\1100.

The intermediate layer 16 is made of polymeric material having a weight of less than 1.2 kg/m$^2$ and a thickness preferably less than 2 mm. The intermediate layer 16 has a uniform thickness and extends continuously along the entire area of the panel 10.

The intermediate layer 16 is conveniently composed of a silicone rubber closed-cell sponge, 1.6 mm thick. An example of a utilizable sponge is the material according to the standard AMS3195. Alternatively the intermediate layer 16 could consist of a neoprene rubber sponge.

The structural layers 14 are attached to the intermediate layer 16 by means of respective adhesive layers 15 conveniently consisting of an epoxy adhesive with a thickness between 0.1 and 0.3 mm and preferably 0.2 mm, and weight of approximately 0.1 kg/m$^2$. An example of a utilizable adhesive consists of the material marketed by 3M, Minnesota Mining Mfg Co., code AF163-2 k. 06.

The intermediate layer 16 extends along the neutral axis N of the cross-section of the panel 10 for the entire area thereof. The term neutral axis N means the locus of the points in which the normal tension resulting from a bending load is zero.

Preferably the neutral axis N is contained inside the intermediate layer 16. In the case in which the two layers 11 and 12 are the same as each other, the neutral axis N extends along the centerline of the intermediate layer 16.

The soundproofing panel 10 described weighs less than 3.5 kg/m$^2$, preferably about 3.5 km/m$^2$ and is about 10 mm; moreover it is non-flammable according to the standards of the field of aeronautic.

The functioning of the soundproofing panel 10 is as follows.

In the case of a static load the intermediate layer 16 bears the shear forces favouring the transfer of the load between the layers 11, 12 and simultaneously absorbing the normal load deriving from bending, acting as a stabilising element between the two layers 11, 12. In this case the design variables are the transverse elasticity modulus and the shear modulus of the damping material.

In case of a cyclic load (sound pressure waves S) the intermediate layer absorbs the flexural load 16 exercised by the wave on the outer layer 11 preventing the total transfer to the inner layer 12 by dissipation. In this case the design variable is the damping coefficient of the damping material.

The positioning of the intermediate layer 16 at the neutral axis N and continuously in adherence to the structural layers 14 satisfies both the loading conditions described above.

Figure 3:
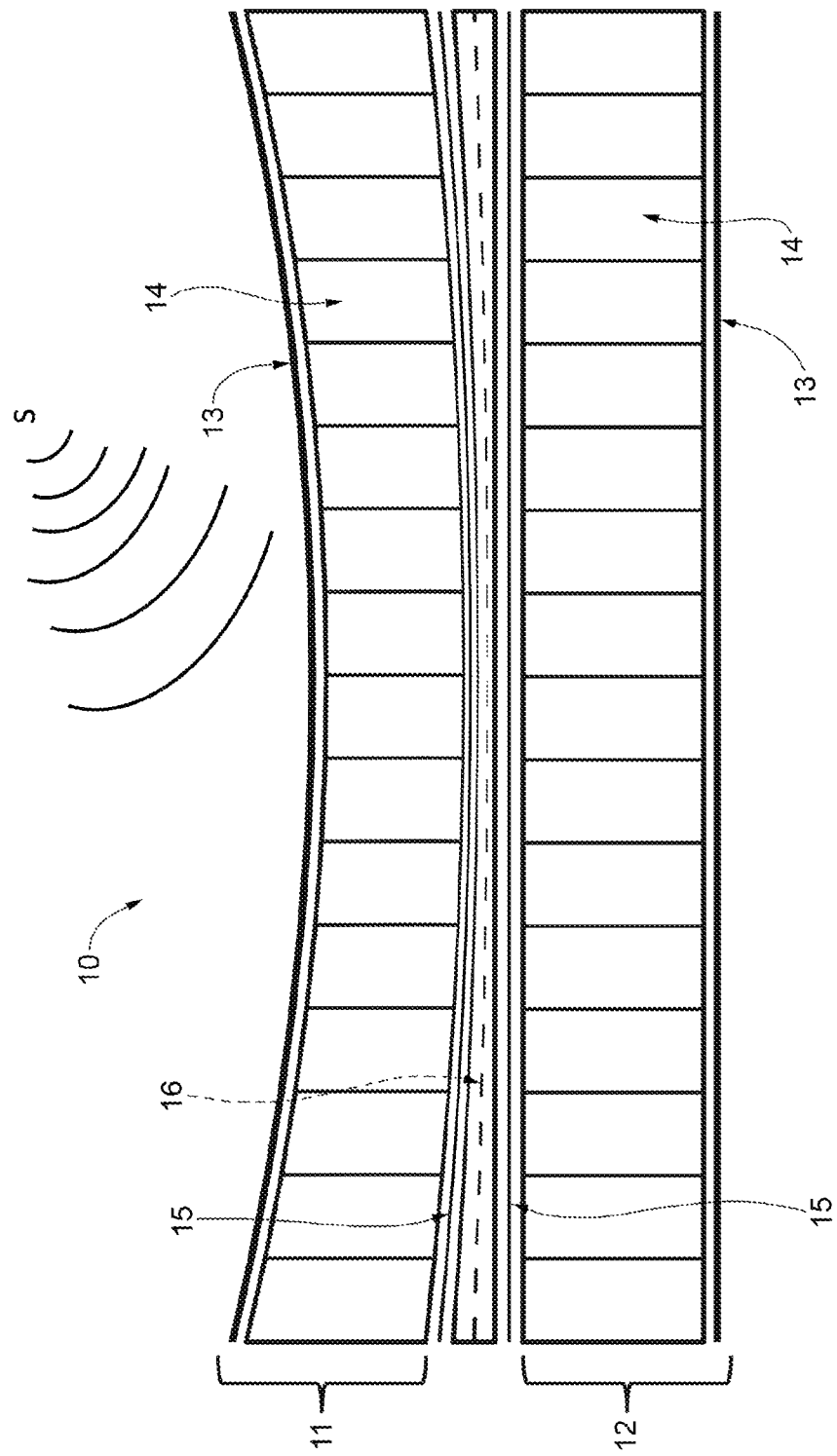
FIG. 3 is a schematic section showing a soundproofed panel according to the invention in a condition of dynamic deformation.

As shown in FIG. 3, the intermediate layer 16 permits an uncoupling of the layer 11, exposed to noise, and the layer 12 facing the inside of the cabin. The bending of the inner layer 12 sheet is less than that of the outer layer 11, so that the pressure waves are transmitted inside in an attenuated manner.

The production of the multilayer panel comprises the steps of:

(i) Preparing the intermediate layer 16 in damping material by exfoliation and chemical activation using acetone;

(ii) Composition of the panel by placing one on top of the other in succession: a first surface layer 13, a first structural layer 14, a first adhesive layer 15, the intermediate layer 16, a second adhesive layer 15, a second structural layer 14 and a second surface layer 13;

(iii) Rolling the multilayer panel 10; and (iv) Making a heat treatment comprising heating at a temperature increasing by 2°-3° per minute up to about 130°, a maintenance step of constant temperature for 75-120 minutes at a pressure of 0.3 MPa and then a cooling down step to 60° with a temperature gradient of 2°-3° per minute.

During the rolling and the heat treatment, the surface layers 16 join with the respective structural layers 14 and the adhesive layer 15 structurally joins the intermediate layer 16 to the structural layers 14.

From the above the advantages of the multilayer soundproofing panel 10 according to the invention are clear.

Since the damping layer 16 is located along the neutral axis N of the damping panel 1 and is connected continuously to the structural layers 14, the intermediate layer 16 transmits only the shear force between the structural layers 14 ensuring sound attenuation.

The use of two layers 11, 12 each provided with a single covering layer, and an intermediate layer 16 of limited thickness makes it possible to obtain a multilayer panel 1 with excellent soundproofing properties but weighing less than the panels of the prior art, and therefore particularly suitable for aircraft applications, also thanks to its non-flammability.

Moreover, the production method of the multilayer panel is a quick, simple and clean process that does not involve moulding steps.

Lastly, it is clear that modifications and variations may be made to the soundproofing panel 10 while remaining within the scope of the appended claims.

The invention claimed is:

1. A panel for soundproofing aircraft interiors comprising a first and a second layer and
an intermediate layer of damping material placed between said first and second layer along a neutral axis (N) of said soundproofing panel
wherein said first and second layer each comprise a structural layer and each comprise a single surface layer placed on the opposite side to the intermediate layer and connected thereto, adhered continuously by an adhesive layer, said intermediate layer extending for the entire area of the panel and being connected to said structural layers of said first and second layer, said intermediate layer comprising a polymer foam material with uniform thickness less than 2 millimeter (mm) and weight less than 1.2 kg/m$^2$ and
wherein said soundproofing panel weighs less than 3.5 kg/m$^2$.

2. The panel of claim 1, wherein said neutral axis (N) coincides with a centerline of said intermediate layer.

3. The panel of claim 1, wherein said polymeric material is a silicone rubber.

4. The panel of claim 1, wherein said polymeric material is a neoprene rubber.

5. The panel of claim 1, wherein said structural layer has a honeycomb structure.

6. The panel of claim 1, wherein said structural layer is a rigid foam.

7. The panel of claim 1, wherein said surface layer is a prepeg.

8. The panel of claim 7, wherein the prepreg is a carbon fiber fabric impregnated with epoxy resin.

9. The panel of claim 1, wherein said adhesive is epoxy.

10. The panel of claim 1, wherein said structural layer is a rigid foam or aramid material with hexagonal cells; the single surface is a carbon fiber fabric impregnated with epoxy resin; and the intermediate layer is a silicone or neoprene rubber.

11. The panel of claim 1, wherein said panel has a thickness of 10 mm.

* * * * *